US007597082B2

(12) United States Patent
Stemmer

(10) Patent No.: US 7,597,082 B2
(45) Date of Patent: Oct. 6, 2009

(54) ARRANGEMENT OF A TIMING CASE COVER

(75) Inventor: Xaver Stemmer, Reichertshofen (DE)

(73) Assignee: Audi AG, Ingolstadt (DE)

( * ) Notice: Subject to any disclaimer, the term of this patent is extended or adjusted under 35 U.S.C. 154(b) by 237 days.

(21) Appl. No.: 11/664,615

(22) PCT Filed: Oct. 1, 2005

(86) PCT No.: PCT/EP2005/010621

§ 371 (c)(1),
(2), (4) Date: Apr. 4, 2007

(87) PCT Pub. No.: WO2006/040029

PCT Pub. Date: Apr. 20, 2006

(65) Prior Publication Data

US 2008/0066710 A1 Mar. 20, 2008

(30) Foreign Application Priority Data

Oct. 8, 2004 (DE) ...................... 10 2004 049 030

(51) Int. Cl.
*F02B 77/00* (2006.01)
*F02F 7/00* (2006.01)
*F16P 1/00* (2006.01)

(52) U.S. Cl. ............................. 123/195 C; 123/195 H; 123/198 E; 74/609

(58) Field of Classification Search ............. 123/195 C, 123/195 H, 198 E; D15/1, 3, 5; D12/126; 74/608, 609
See application file for complete search history.

(56) References Cited

U.S. PATENT DOCUMENTS

| | | | | |
|---|---|---|---|---|
| 3,418,994 A * | 12/1968 | Freyn | ..................... | 123/195 R |
| 4,883,031 A | 11/1989 | Ampferer | | |
| 5,000,142 A * | 3/1991 | Aruga et al. | ............ | 123/195 C |

FOREIGN PATENT DOCUMENTS

| | | |
|---|---|---|
| CH | 150401 | 1/1932 |
| EP | 0 705 964 | 4/1996 |
| EP | 0 837 236 | 4/1998 |
| EP | 1 079 092 | 2/2001 |
| EP | 1 489 282 | 12/2004 |

* cited by examiner

*Primary Examiner*—Michael Cuff
*Assistant Examiner*—Ka Chun Leung
(74) *Attorney, Agent, or Firm*—Novak Druce & Quigg LLP

(57) ABSTRACT

The invention relates to an arrangement of a timing case cover on a reciprocating-piston internal combustion engine, having an engine block (ZKG), a crankshaft pivot-mounted in the engine block, an oil pan which tightly seals the engine block to the bottom, and a timing case cover which is located on the engine block on the front side, which adjoins the engine block via a second, end-side sealing surface, and which has a through opening to rout out the drive torque of the crankshaft for an accessory drive. To achieve reliable sealing and a short structure of the internal combustion engine, the sealing surface of the timing case cover or timing case covers, examined in a side view, is made to run obliquely down to the inside such that on the engine block-side a timing case chamber which decreases in its depth downward is formed.

10 Claims, 4 Drawing Sheets

ARRANGEMENT OF A TIMING CASE COVER

This application is a U.S. National Phase under 35 USC § 371 of PCT/EP2005/016021, filed Oct. 1, 2005, which claims priority from DE 102004049030.9, filed Oct. 8, 2004, each of which is hereby incorporated by reference in its entirety.

The invention relates to an arrangement of a timing case cover on a reciprocating piston internal combustion engine.

BACKGROUND OF THE INVENTION

In conventional, known internal combustion engines of generic design there is overlapping of the sealing surfaces of the oil pan—which seals to the bottom with the front-side timing case cover which seals to the front, which overlapping for internal combustion engines which are axially as short as possible can constitute a problematic seal.

The object of the invention is to propose an arrangement of the generic type which in addition to reliable sealing of the oil pan and timing case cover permits a structure of the internal combustion engine which is favorable in terms of production engineering and which is structurally short.

SUMMARY OF THE INVENTION

It is suggested that the sealing surface of the timing case cover or the timing case covers examined in a side view runs obliquely down to the inside, such that on the engine block-side a timing case chamber which decreases in its depth downward is formed. This yields a more weight-favorable engine block, facilitated installation of the control components such as the camshaft drive, differential shaft drive, oil pump drive, etc., by better accessibility, and adaptability of the timing case cover which may shorten the overall length of the internal combustion engine, which cover can be formed of a lightweight material such as magnesium or a plastic. Furthermore, within the timing case chamber and without an increase in the overall length of the internal combustion engine there can be housed therein other components of the engine such as an all separator for the crankcase ventilation means.

In this connection, the side walls of the engine block which border the timing case chamber proceeding from the first bearing end plate of the crankshaft bearing configuration can increase to the top in their longitudinal extension (dimension I). Thus material is saved on the engine block without added casting effort in fabrication.

Furthermore, in a development of the invention the sealing surface of the timing case cover underneath the axis of rotation of the crankshaft can be made to run forward and down opposite the indicated bevel in order to produce the connection to the subjacent oil pan in a structurally favorable manner.

The sealing surface sections of the sealing surface can be made straight and tilted at an angle a of approximately 120 degrees to one another in a manner favorable to production engineering; but optionally it can be structurally advantageous if the lower sealing surface section (16*c*) of the sealing surface (16) is made to curve forwardly with a radius r.

Furthermore an end wall section of the timing case cover which lies in the region of the through opening for the crankshaft and adjacent to the drive wheel of the accessory drive can be set back relative to an overlying end wall section. In this way, without added production engineering effort, the accessory drive for assemblies, for example for an air conditioning compressor and/or a generator, can be moved still closer to the internal combustion engine.

In one version of the engine block the bearing end plate with the other bearing end plates of the main crankshaft bearing configuration can be combined structurally into a bed-plate construction which stiffens and borders the engine block partially toward the bottom. In this connection the bed-plate construction can moreover bear the sealing surface for the adjoining oil pan. The oil pan sealing surface can be also provided directly on the engine block.

Furthermore, the engine block or the bed-plate construction can preferably border the timing case cover underneath its sealing surface and decoupled from the oil pan sealing surface. The problematic intersection of the sealing surfaces is thus avoided.

Finally, with the same advantages the upper sealing surface section of the sealing surface of the timing case cover can be decoupled from the cylinder head connecting surface of the engine block.

DETAILED DESCRIPTION OF THE PREFERRED EMBODIMENTS OF THE INVENTION

Figure 1:
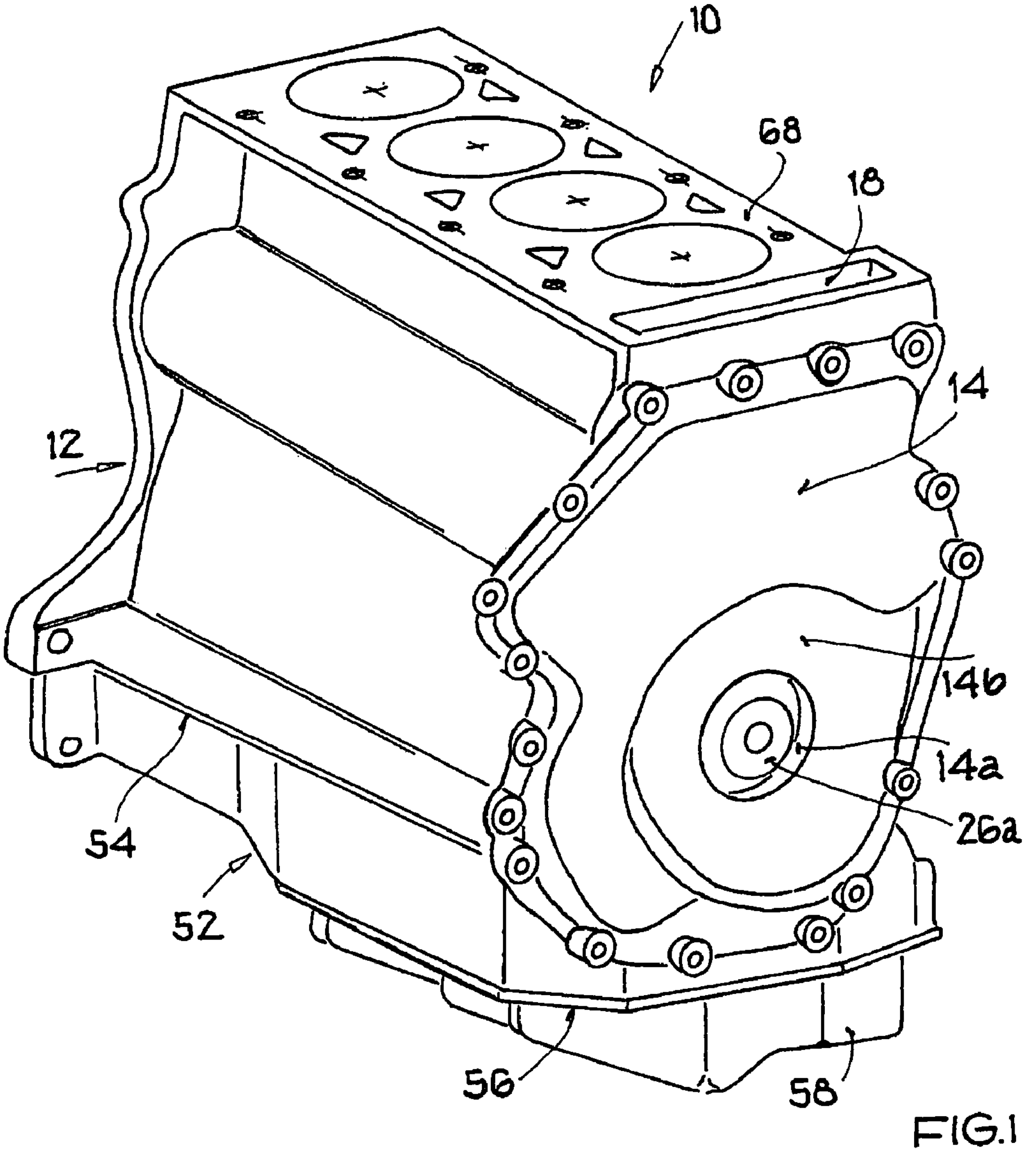
FIG. 1 shows a four-cylinder, in-line reciprocating internal combustion engine partially three-dimensionally, with an engine block, a front-side timing case cover, a bed-plate construction and an oil pan.

In FIG. 1 a four-cylinder, reciprocating piston, in-line internal combustion engine is designated as 10, but is shown without the cylinder head. The internal combustion engine 10 is only described to the extent this is necessary for an understanding of this invention. Otherwise the internal combustion engine 10 can be of known design familiar to one skilled in the art.

The engine block 12 (ZKG) of the internal combustion engine 10 produced in a diecasting process on its front (=control side) has a timing case cover 14 which is tightly connected to the engine block 12 by way of a more or less annular sealing surface 16 (compare FIG. 2, crosshatched) and optionally a seal (not shown) or is attached to the engine block by bolts which are not shown. The sealing surface 16 is made on the side walls 12*a* and on the upper terminating wall 12*b* of the engine block 12 and in the lower region on a bearing end plate 50 which is still to be described.

The timing case cover 14 encloses a shaft-shaped timing case chamber 18 in which there are two chain drives 20, 22.

The first chain drive 20 which is directly adjacent to the engine block 12 with a chain wheel 24 on the front drive journal 26*a* of the crankshaft 26 by way of a chain 28 drives two differential shafts 30, 32, the chain 30 interacting with the chain wheel 34 of the differential shaft 30 and with a deflection chain wheel 36. The deflection chain wheel 36 is drive-connected by way of cylindrical gears to the second differential shaft 32. The differential shafts 30, 32 which are pivot-mounted in the engine block 12 are thus driven in opposite directions and with twice the crankshaft speed for formation of modified Lancaster mechanical balancing.

The second chain drive 22 is only partially visible and is used to drive two camshafts for valve control of the internal combustion engine 10, the camshafts being located in the conventional manner in the cylinder head. In this connection a second chain wheel 42 on the drive journal 26*a* of the crankshaft 26 drives the indicated camshafts (not shown) by way of a chain 44.

The crankshaft 26 (compare FIGS. 1 and 3) is pivot-mounted in the engine block in the conventional manner via main bearings generally designated as 46. The main bearings 46 are composed of one upper bearing block 48 which is made in the corresponding transverse walls of the engine block 12, and lower bearing end plates 50 which together with the corresponding bearing shells (without reference numbers) encompass the bearing journals 26*b* of the crankshaft 26.

The indicated bearing end plates 50 are integrated into a bed-plate construction 52 (compare FIG. 1) which is attached to the engine block 12 from underneath and stiffens the engine block 12 similarly to a ladder frame and also partially closes of the latter to the bottom.

The bed-plate construction 52 is permanently attached to the engine block 12 via a flat connecting surface 54 and by means of bolts which are not shown. In the front region the bed-plate construction 52 is open to the bottom and has a sealing surface 56 to which the oil pan 58 is tightly screwed.

The timing case cover 14 has a rotationally symmetrical through opening 14*a* through which (and with interposition of a shaft gasket) the belt wheel 60 of a power take-off 62 which is not shown is driven with a poly-V belt 64. The power take-off 62 can drive an air conditioning compressor, a generator, a servo pump, etc.

Figure 3:
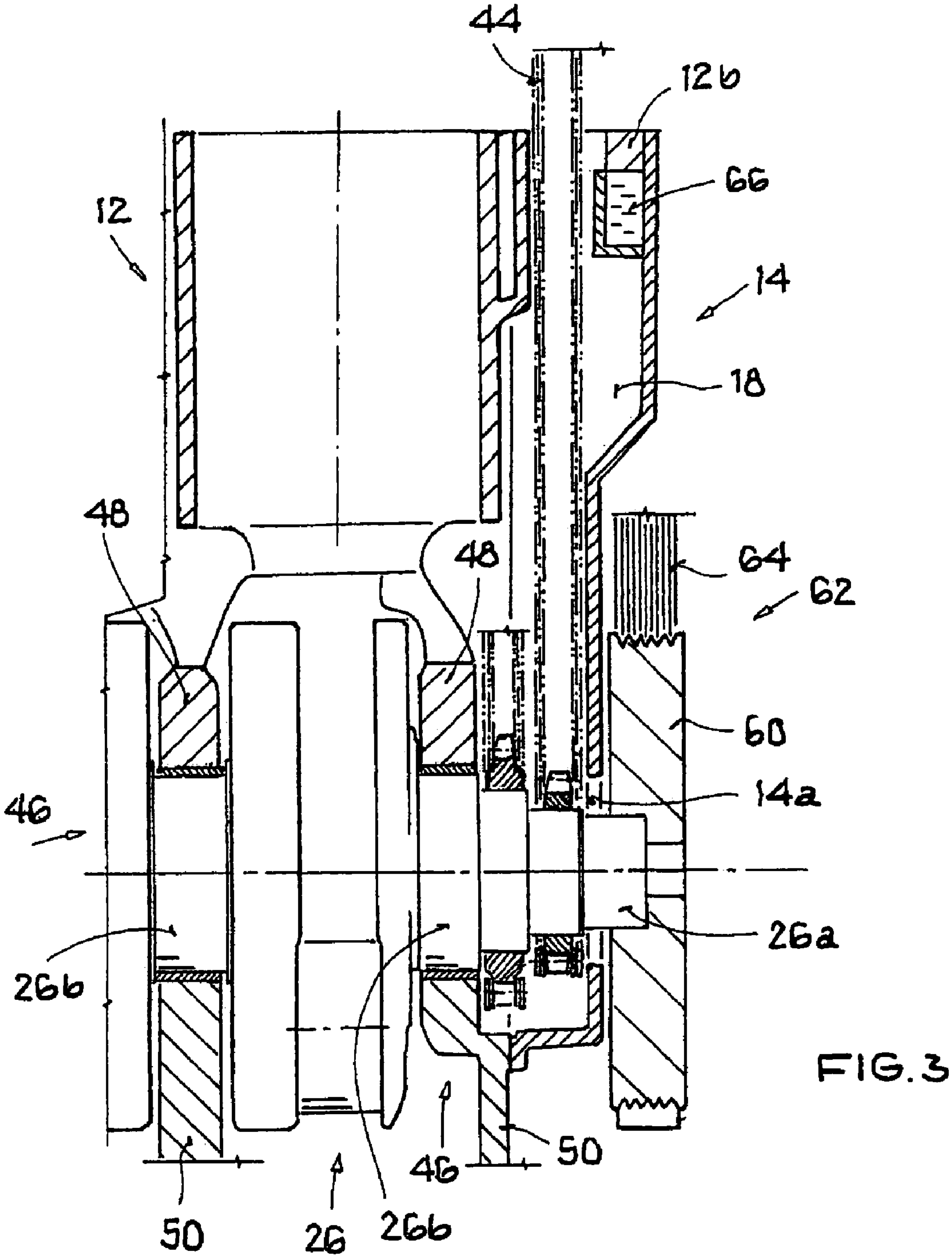
FIG. 3 shows a section according to line III-III of FIG. 2 along the axis of rotation of the crankshaft through the first bearing cover and the timing case cover.
Figure 4:
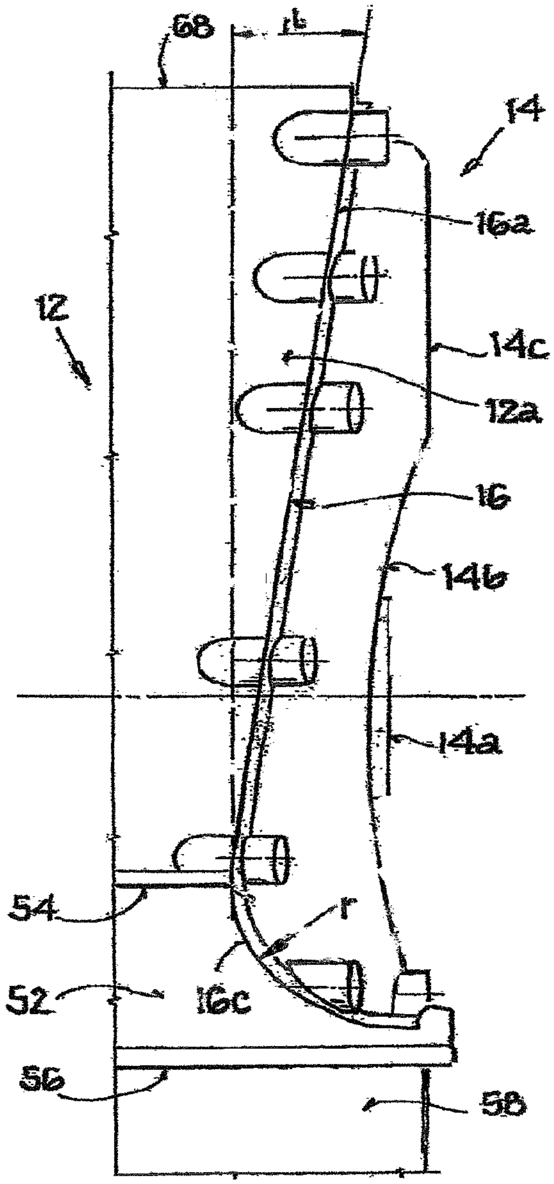
FIG. 4 shows a side view of the engine block and of the timing case cover with the oblique sealing surface and the set-back end wall region.

The sealing surface 16 of the timing case cover 14 (compare especially FIG. 4), examined in a side view, runs with a sealing surface section 16*a* from top to bottom obliquely to the rear relative to a vertical line, the side walls 12*a* of the engine block 12 decreasing in their longitudinal extension accordingly toward the bottom (compare illustrated vertical line and dimension I of FIG. 4). This results in a timing case chamber 18 which decreases in its depth downward (with the timing case cover 14 removed) in which in addition to the described chain drives 20, 22 functional parts can also be installed, for example as is indicated in FIG. 3 an oil separator 66 for the crankcase gases. To the degree to which the side walls 12*a* of the engine block 12 diminish, the side walls of the timing case cover 14 essentially grow, as is apparent.

The sloped configuration of the timing case cover 14 and the set-back end wall section 14*b* in the region of the through opening 14*a* relative to the overlying end wall section 14*c* (compare FIG. 4) makes it possible to furthermore position the power take-off 62 with its belt wheel 60 and the poly-V belt 64 nearer the front end 26*a* of the crankshaft 26, by which the overall length of the internal combustion engine is accordingly shortened.

Furthermore the bed-plate construction 52 is made to border the timing case cover 14 to the front, the indicated sealing surface 16 machined into the bearing end plate 50 with a sealing surface section 16*c* at a radius r (FIG. 4) running out toward the end of the bed-plate construction 52.

The timing case cover 14 is thus also attached to the bed-plate construction 52 to form a stiff combination. The two sealing surfaces 16*c* and 56 of the timing case cover 14 and the oil pan 58 are however as is apparent decoupled from one another and made separately. This also applies to the upper sealing surface section 16*a* of the sealing surface 16 of the timing case cover 14 which is likewise decoupled from the cylinder head connection surface 68 of the engine block 12, as is apparent from FIG. 4, and does not intersect it.

Figure 2:
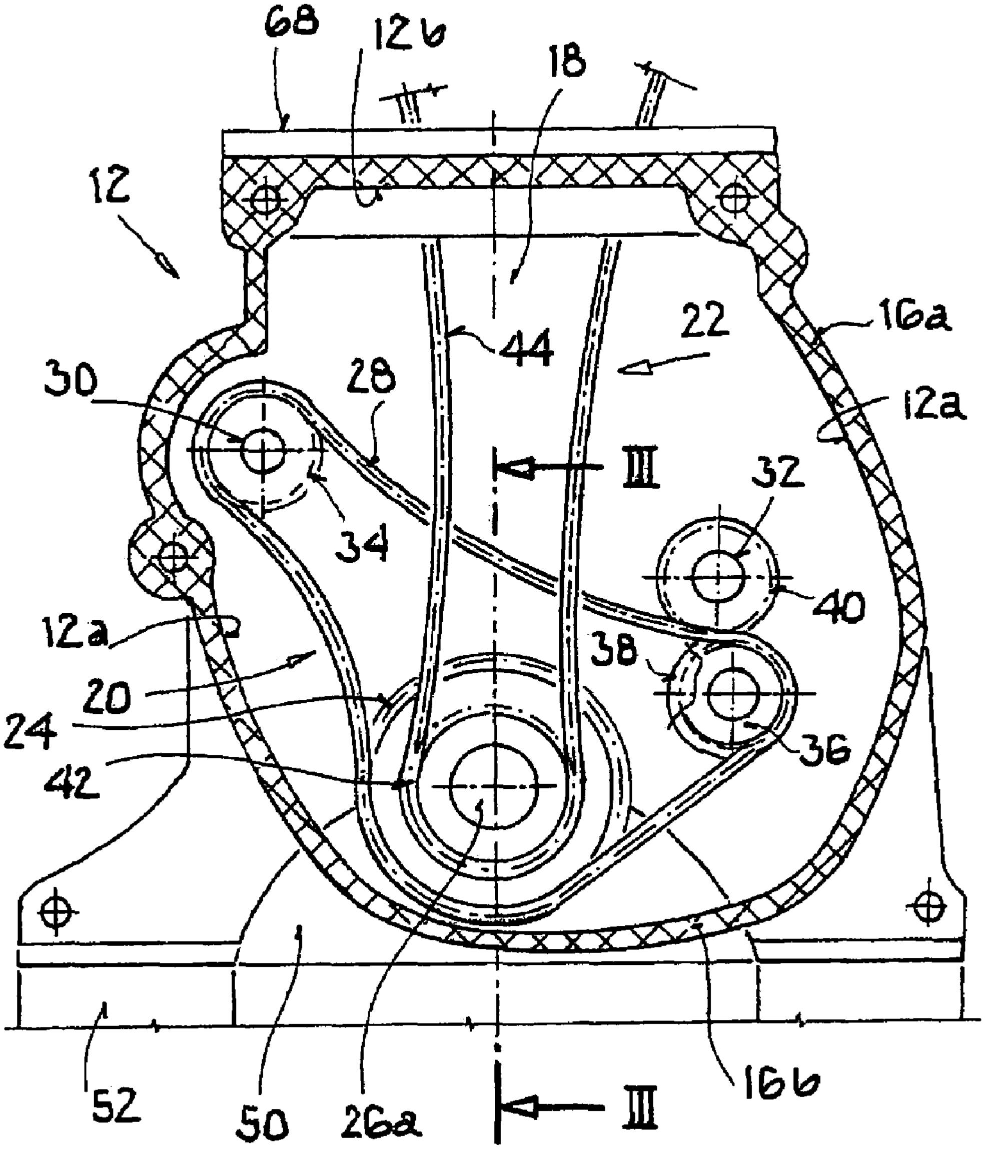
FIG. 2 shows a front view of the internal combustion engine as shown in FIG. 1, with the timing case cover removed.

The sealing surface 16 (FIG. 2, shown crosshatched) is produced in one step by cutting, the bearing end plate 50 and the bed-plate construction 52 being pre-mounted on the engine block 12. This preinstallation is necessary in any event for machining for example of the bearing holes for the crankshaft 26.

The invention is not limited to the illustrated embodiment. Thus the engine block 12 can also be made without a bed-plate construction 52 with individual bearing end plates 50, and the indicated side walls 12*a* of the engine block 12 can be drawn down as far as the described sealing surface 56 for the oil pan 58. The sealing surface 16 of the timing case cover 14 can then be guided down (compare FIG. 2) laterally from the bearing end plate 50 and can be closed in a ring shape with a crosspiece or a correspondingly shaped and machined configuration of the bearing end plate 50.

Figure 4A:
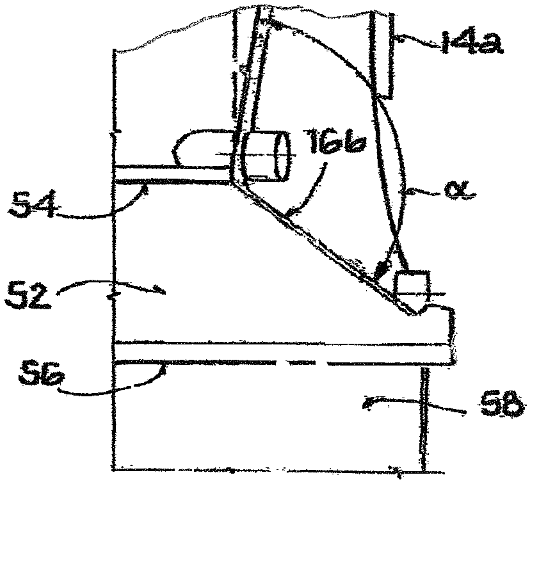
FIG. 4*a* is a partial view of the engine block and timing case cover shown in FIG. 4, illustrating an alternative configuration of the lower end of the curve.

Furthermore, the lower sealing surface section 16*b* of the cover can be made straight and at an angle of approximately 120 degrees to the top sealing surface section 16*a*, the transition of the sealing surface sections 16*a* and 16*b* being positioned underneath the axis of rotation of the crankshaft, as shown in FIG. 4*a*.

The invention claimed is:

1. A cover for the timing mechanisms disposed on the front end of the engine block of an internal combustion vehicle, having an oil pan mounted on the underside thereof, comprising:

a member having a rear peripheral wall section provided with a partially peripheral surface sloping downwardly and rearwardly, disposable in mating relation with a downwardly and rearwardly sloping mounting surface of said engine block, a front wall section spaced from said rear wall section having an opening for receiving an end of a crankshaft of said engine therethrough when said member is mounted on said engine block and a side wall section interconnecting said front and rear wall sections; and means for securing said member to said engine block, wherein the depth of the chamber defined upon the mounting of said member on said engine block diminishes from an upper to a lower end thereof.

2. A cover according to claim 1 wherein said peripheral surface of said rear peripheral wall mounts on a surface of said engine block sloping downwardly and rearwardly.

3. A cover according to claim 1 wherein a portion of said front wall section of said member below the opening for said crankshaft extends downwardly and forwardly.

4. A cover according to claim 3 wherein said portion of said front wall section of said member is planar and is angularly spaced 120° from an adjoining portion of said front wall section.

5. A cover according to claim 3 wherein said portion of said front wall section of said member is arcuate.

6. A cover according to claim 1 wherein a portion of said front wall section about said opening in said front wall section is indented.

7. A cover according to claim 1 wherein said cover is mounted on an engine block provided with transversely disposed members in which said crankshaft is journaled, which are secured at the ends thereof to a peripheral member secured to the underside of said engine block.

8. A cover according to claim 7 wherein said oil pan is secured to the underside of said peripheral member.

9. A cover according to claim 7 wherein said member is connected at a lower end thereof to one of said peripheral member and said oil pan.

10. A cover according to claim 1 wherein said member is detachably secured to said engine block.

* * * * *